United States Patent
Noda

(10) Patent No.: US 11,811,279 B2
(45) Date of Patent: Nov. 7, 2023

(54) METHOD FOR ASSEMBLING COIL AND APPARATUS FOR ASSEMBLING COIL

(71) Applicant: TOYOTA JIDOSHA KABUSHIKI KAISHA, Toyota (JP)

(72) Inventor: Ken Noda, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/680,835

(22) Filed: Feb. 25, 2022

(65) Prior Publication Data

US 2022/0302809 A1   Sep. 22, 2022

(30) Foreign Application Priority Data

Mar. 16, 2021   (JP) ................. 2021-042024

(51) Int. Cl.
*H02K 15/10* (2006.01)
*H02K 15/06* (2006.01)

(52) U.S. Cl.
CPC ........... *H02K 15/10* (2013.01); *H02K 15/066* (2013.01)

(58) Field of Classification Search
CPC ..... H02K 15/10; H02K 15/066; H02K 15/085
See application file for complete search history.

(56) References Cited

U.S. PATENT DOCUMENTS

| | | | | |
|---|---|---|---|---|
| 5,533,252 A | * | 7/1996 | Kawamura | ........ H02K 15/0018 29/736 |
| 2002/0089250 A1 | | 7/2002 | Naka et al. | |
| 2003/0168547 A1 | * | 9/2003 | Komuro | ............... H02K 15/085 242/432.5 |
| 2005/0005422 A1 | * | 1/2005 | Kuroyanagi | ....... H02K 15/0442 29/596 |
| 2005/0061907 A1 | * | 3/2005 | Hashimoto | .......... H02K 15/022 242/590 |
| 2011/0215660 A1 | * | 9/2011 | Goto | ..................... H02K 5/203 310/53 |
| 2014/0175935 A1 | * | 6/2014 | Tsuchiya | ................ H02K 3/522 310/214 |
| 2019/0103792 A1 | * | 4/2019 | Matsumoto | .......... H02K 15/085 |

FOREIGN PATENT DOCUMENTS

| | | | | |
|---|---|---|---|---|
| CN | 108811518 B | * | 5/2020 | ............. H02K 15/10 |
| JP | 2000-308314 A | | 11/2000 | |
| JP | 2007089310 A | * | 4/2007 | |
| JP | 2018-067996 A | | 4/2018 | |
| JP | 2020-108212 A | | 7/2020 | |
| JP | 2020-124055 A | | 8/2020 | |

* cited by examiner

*Primary Examiner* — Peter Dungba Vo
*Assistant Examiner* — Jose K Abraham
(74) *Attorney, Agent, or Firm* — Sughrue Mion, PLLC

(57) ABSTRACT

An apparatus for assembling a coil includes a blade inserted into a slot of a stator core in a state where insulating paper is inserted into the slot. In a method for assembling the coil, the insulating paper is inserted into the slot of the stator core, the blade is inserted into the slot into which the insulating paper is inserted, the coil is inserted into the slot into which the blade is inserted, the coil being inserted in a direction opposite to a direction in which the blade is inserted. When the coil is inserted into the slot, the blade is pulled out from the slot along with the insertion of the coil into the slot.

3 Claims, 4 Drawing Sheets

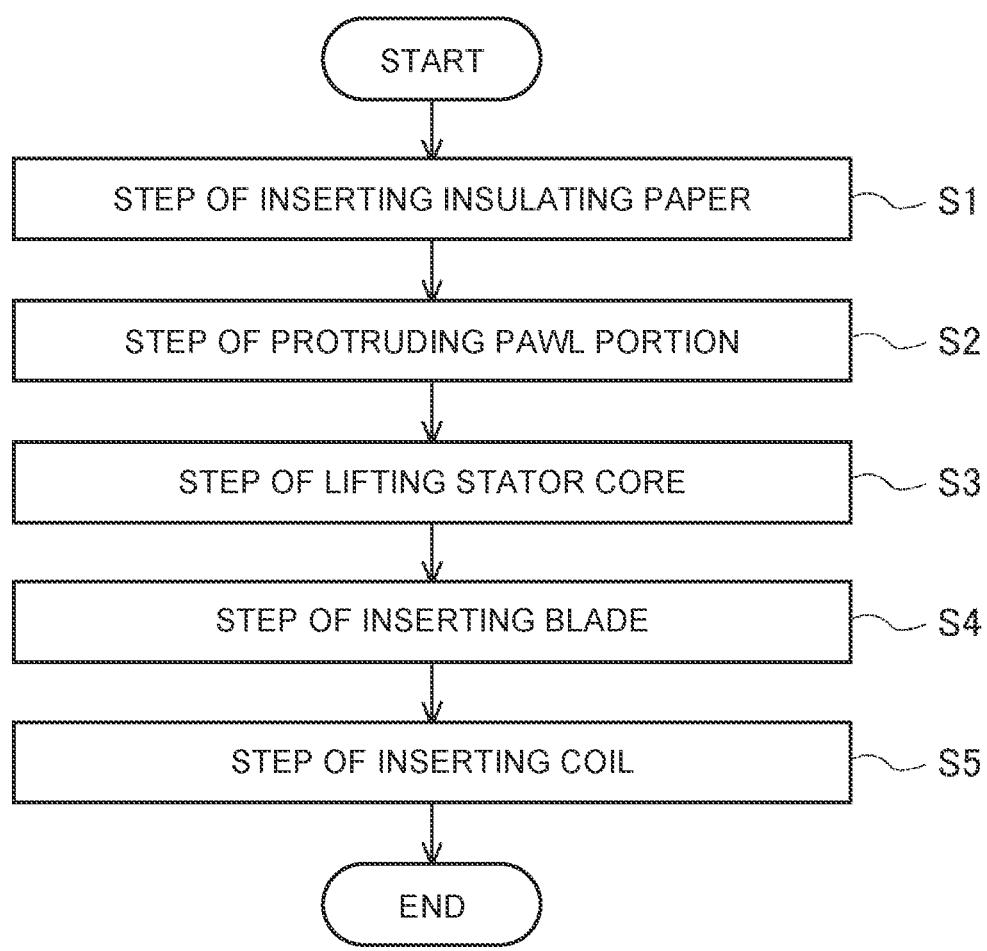

METHOD FOR ASSEMBLING COIL AND APPARATUS FOR ASSEMBLING COIL

CROSS-REFERENCE TO RELATED APPLICATION

This application claims priority to Japanese Patent Application No. 2021-042024 filed on Mar. 16, 2021, incorporated herein by reference in its entirety.

BACKGROUND

1. Technical Field

The present disclosure relates to a method for assembling a coil and an apparatus for assembling a coil.

2. Description of Related Art

When a coil is inserted into a slot of a stator core, the slot having insulating paper arranged inside, when the coil and the insulating paper come into contact with each other, or when there is friction between the coil and the insulating paper, the insulating paper shifts or slips down from the slot. Japanese Unexamined Patent Application Publication No. 2020-124055 (JP 2020-124055 A) describes a method for assembling a coil, and, in this method, insulating paper formed into a cylinder shape is inserted into a slot of a stator core, both ends of the insulating paper are arranged to protrude from the slot, the both ends of the insulating paper protruding from the slot are formed into a tapered shape, and, while one of the both ends of the insulating paper is supported by a support plate, the coil is inserted into the slot from a side where the insulating paper is not supported by the support plate. Further, JP 2020-124055 A describes that, since the end portion of the insulating paper on the side that is not supported by the support plate is hooked on the stator core, and the other end portion of the insulating paper is supported by the support plate, it is possible to prevent the insulating paper from shifting or slipping down when the coil is inserted into the slot.

SUMMARY

In JP 2020-124055 A, since a step for processing the both ends of the insulating paper into the tapered shape is necessary, it takes extra time for assembling the coil. Also, since it is necessary to arrange the insulating paper so that the both ends of the insulating paper protrude from the slot, and to process the protruding portions into the tapered shape, extra material is required for the insulating paper. Therefore, extra time and cost are necessary.

The present disclosure has been accomplished in order to solve this issue, and an object thereof is to provide a method for assembling a coil and an apparatus for assembling a coil by which shift of insulating paper is restrained more easily.

A method for assembling a coil according to the present disclosure includes a step of inserting insulating paper into a slot of a stator core, a step of inserting a blade into the slot into which the insulating paper is inserted, and a step of inserting the coil into the slot into which the blade is inserted. The coil is inserting in a direction opposite to a direction in which the blade is inserted into the slot. In the step of inserting the coil, the blade is pulled out from the slot along with the insertion of the coil into the slot.

An apparatus for assembling a coil according to the present disclosure includes a blade inserted into a slot of a stator core in a state where insulating paper is inserted into the slot. The insulating paper is inserted into the slot of the stator core. The blade is inserted into the slot into which the insulating paper is inserted, and the coil is inserted into the slot into which the blade is inserted. The coil is inserted in a direction opposite to a direction in which the blade is inserted into the slot. When the coil is inserted into the slot, the blade is pulled out from the slot along with the insertion of the coil into the slot.

With the method for assembling the coil and the apparatus for assembling the coil according to the present disclosure, the coil is inserted in a state where the insulating paper is widened by the blade. Therefore, the step of arranging the insulating paper so that both ends of the insulating paper protrude from the slot, and processing the protruding portions into the tapered shape is no longer necessary. Also, it is not necessary to use extra material for the insulating paper. Thus, it is possible to provide the method and the apparatus for assembling the coil by which shift of the insulating paper is restrained more easily.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 4 is a flowchart showing a method for assembling the coil according to the first embodiment of the present disclosure.

DETAILED DESCRIPTION OF EMBODIMENTS

First Embodiment

Hereinafter, a first embodiment of the present disclosure is described with reference to the drawings. It should be noted that the present disclosure is not limited to the first embodiment. Also, the description and drawings below are simplified as appropriate for the sake of clarity.

Figure 1:
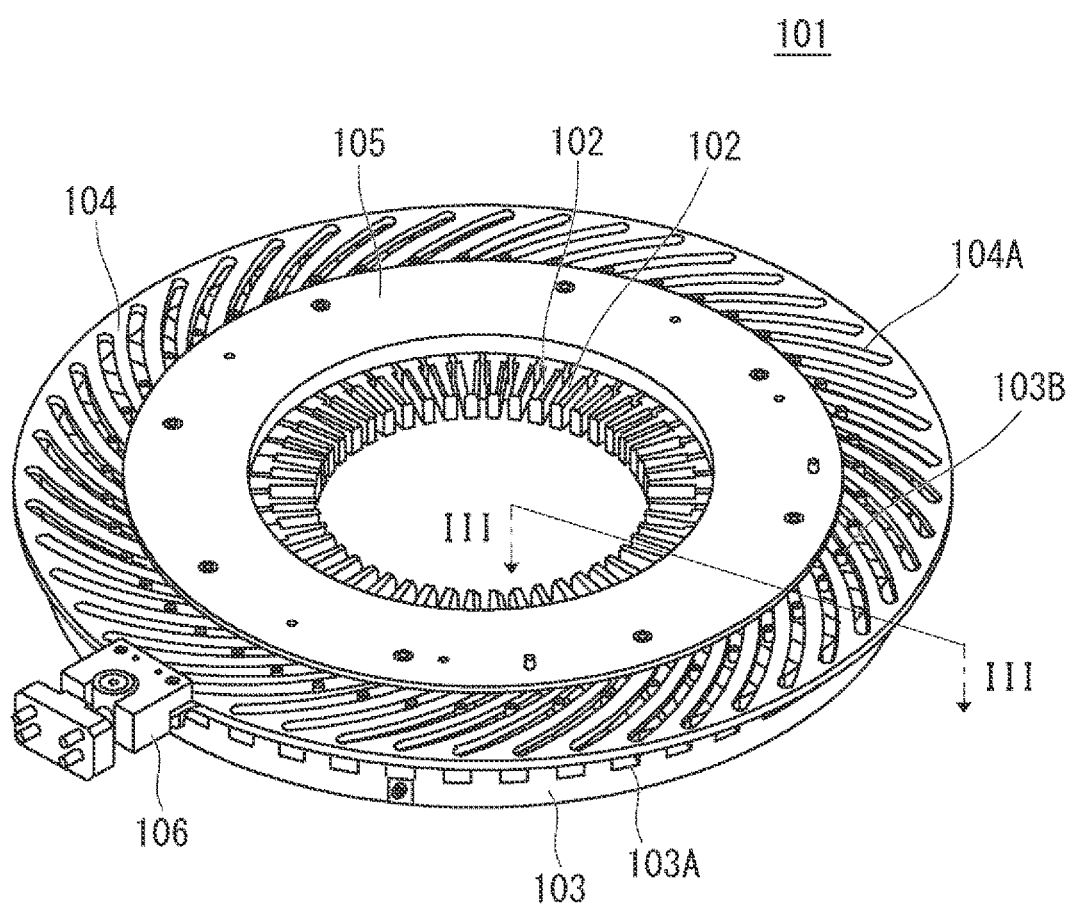
FIG. 1 is a perspective view of a defense cuff support of an apparatus for assembling a coil according to a first embodiment of the present disclosure.

FIG. 1 is a perspective view of a defense cuff support 101 of an apparatus 100 for assembling a coil according to the first embodiment. As shown in FIG. 1, the defense cuff support 101 is an annular apparatus that reforms the coil when the coil is assembled to a stator core 200 (see FIG. 2). Specifically, when the coil is assembled to the stator core 200, the defense cuff support 101 is arranged on an end surface of the stator core 200 on one side in an axis direction that is an end surface on a side where the coil is inserted. In other words, the defense cuff support 101 is arranged on the side of the stator core 200 opposite to the side where a blade described later is inserted. Also, as shown in FIG. 1, the defense cuff support 101 is provided with pawl portions 102, a guide portion 103, an operating portion 104, a holding panel 105, a rotating device 106, and so on.

The pawl portions 102 are arranged at positions corresponding to teeth 200A (see FIG. 2) of the stator core 200. In other words, the number of the pawl portions 102 provided in the defense cuff support 101 is the same as that of the teeth 200A provided in the stator core 200. Also, the pawl portions 102 are supported by the guide portion 103 so as to be able to move in and out with respect to an inner peripheral surface of the defense cuff support 101 towards the central axis of the defense cuff support 101 along the radial direction of the defense cuff support 101. FIG. 1 shows a state where the pawl portions 102 protrude from the inner peripheral surface of the defense cuff support 101. The inner peripheral surface of the defense cuff support 101 is made of an inner peripheral surface of the holding panel 105, an inner peripheral surface of the operating portion 104, and an inner peripheral surface of the guide portion 103 (see FIG. 3).

The guide portion 103 is an annular member and supports the pawl portions 102 so that the pawl portions 102 can move in and out along the radial direction of the stator core 200. Specifically, the guide portion 103 includes groove portions 103A for the pawl portions 102 to slide on, and pins 103B that are fixed to the pawl portions 102, respectively, and move along the groove portions 103A together with the pawl portions 102, respectively. In other words, the numbers of the groove portions 103A and the pins 103B provided in the guide portion 103 are the same as that of the pawl portions 102. Also, the groove portions 103A are provided along the radial direction of the defense cuff support 101. The pins 103B have a height to an extent that they can be inserted into hole portions 104A, respectively. The hole portions 104A are formed in the operating portion 104 described later.

The operating portion 104 is an annular member and includes the arc-shaped hole portions 104A into which the pins 103B fixed to the pawl portions 102 are inserted, respectively. In other words, the number of the hole portions 104A formed in the operating portion 104 is the same as that of the pawl portions 102.

The holding panel 105 is an annular member and holds the operating portion 104 against the guide portion 103 so that the operating portion 104 is able to rotate around the central axis of the defense cuff support 101.

The rotating device 106 is a motor and causes the operating portion 104 to rotate with respect to the guide portion 103 around the central axis of the defense cuff support 101.

Further, as the operating portion 104 rotates with respect to the guide portion 103 around the central axis of the defense cuff support 101, the pins 103B slide in the arc-shaped hole portions 104A and move along the groove portions 103A, respectively. Thus, the pawl portions 102 slide in the groove portions 103A, respectively, and move in and out from the inner peripheral surface of the defense cuff support 101 to the central axis of the defense cuff support 101 along the radial direction of the defense cuff support 101. As shown in FIG. 1, when the pawl portions 102 protrude (are moved out) from the inner peripheral surface of the defense cuff support 101, the neighboring pawl portions 102 and the inner peripheral surface of the defense cuff support 101 form paths. Each of the paths has a U-shape that is substantially the same shape as that of each of slots 200B. Then, the coil inserted into the slot 200B is reformed by the paths.

Figure 2:
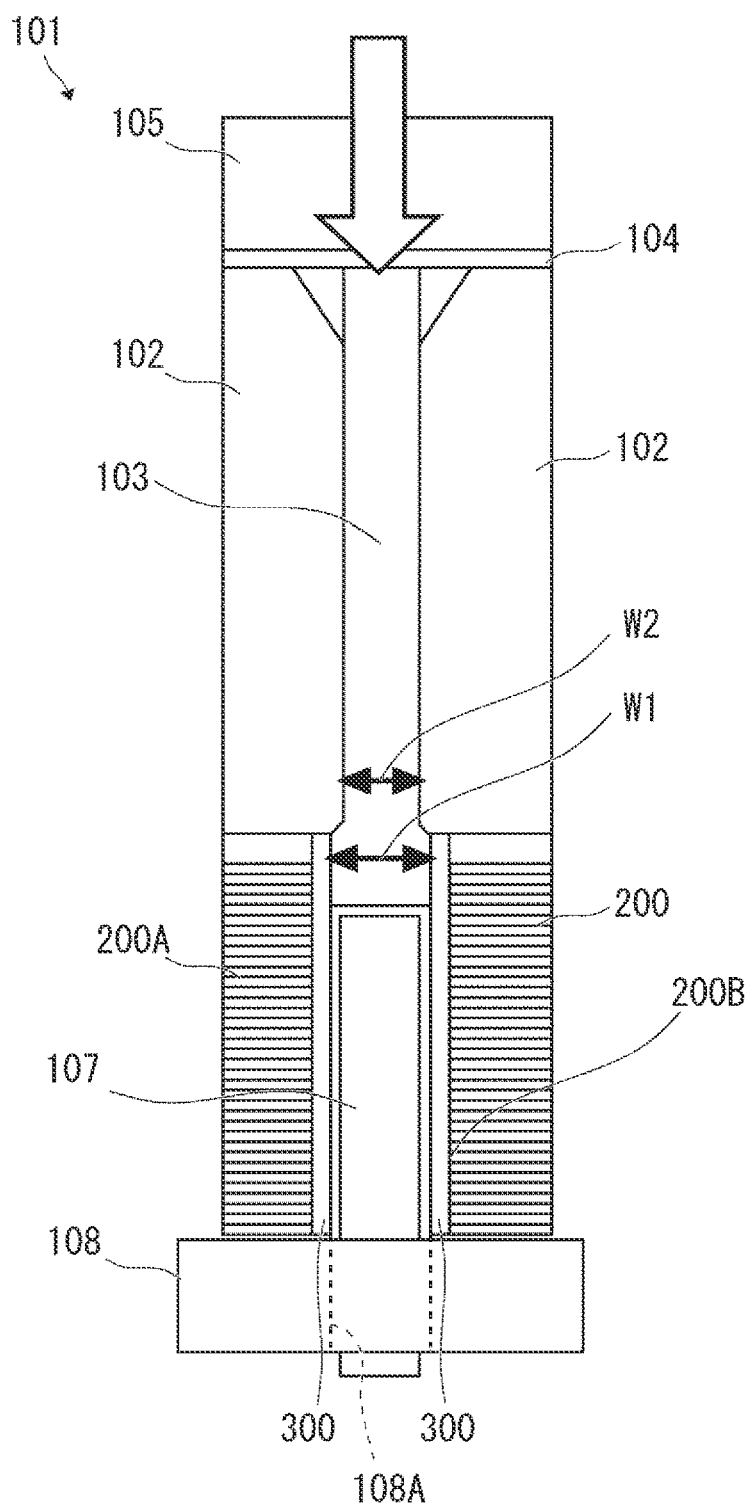
FIG. 2 is a schematic view of a state where pawl portions neighboring each other in the defense cuff support of the apparatus for assembling the coil according to the first embodiment of the present disclosure are seen in a radially outward direction from the center of the defense cuff support.

FIG. 2 is a schematic view of the apparatus 100 for assembling the coil. The apparatus 100 is seen in a radially outward direction from the center of the defense cuff support 101. FIG. 2 only shows portions of the apparatus 100 for assembling the coil, the portions corresponding to the pawl portions 102 neighboring each other in the defense cuff support 101. Further, in FIG. 2, an insertion direction of the coil (not shown) into the slots 200B of the stator core 200 is shown by a thick arrow. As shown in FIG. 2, the apparatus 100 for assembling the coil further includes a blade 107 and a support 108, in addition to the defense cuff support 101. In FIG. 2, dimensions of the defense cuff support 101, the blade 107, and the support 108 are different from actual dimensions in order to make illustration clear. Also, in FIG. 2, the hutching showing a section of the support 108 is omitted in order to make the illustration clear.

The blade 107 is provided in the apparatus 100 for assembling the coil so as to be able to move back and forth to the slot 200B of the stator core 200 supported by the support 108. Specifically, a hole portion 108A through which the blade 107 can pass is formed in the support 108, and the blade 107 goes through the hole portion 108A of the support 108 and is inserted into the slot 200B. In other words, the apparatus 100 for assembling the coil includes the same number of the blades 107 as that of the slots 200B of the stator core 200. Then, with a power source (not shown) such as a motor of the apparatus 100 for assembling the coil, the blades 107 are inserted into the slots 200B of the stator core 200, respectively, in a state where insulating paper 300 is inserted in each of the slots 200B. Specifically, the blade 107 is inserted into the slot 200B from one of both end surfaces of the stator core 200 in the axis direction on a side opposite to a side where the coil is inserted. Also, when the coil is inserted into the slot 200B, the blade 107 is pulled out from the slot 200B by the power source along with the insertion of the coil into the slot 200B. Thus, the blade 107 allows the coil to be inserted into the slot 200B of the stator core 200 in a state where the insulating paper 300 is widened. Specifically, when the coil is inserted into the slot 200B, the blade 107 is able to prevent the insulating paper 300 from shifting or falling down from the slot 200B due to contact between the coil and the insulating paper 300 or due to friction between the coil and the insulating paper 300. The insulating paper 300 is inserted into the slot 200B in a form along an inner wall of the slot 200B. In other words, when the slot 200B has practically the U-shape, the insulating paper 300 is bent into the U-shape and inserted into the slot 200B.

The support 108 comes into contact with one end surface of the stator core 200 on a side opposite to a side where the defense cuff support 101 is arranged, out of the both end surfaces of the stator core 200 in the axis direction, and supports the stator core 200. Further, the support 108 is operated by a power source (not shown) such as a motor of the apparatus 100 for assembling the coil. Then, the support 108 supports the stator core 200 so as to allow the stator core 200 to move closer to or away from the defense cuff support 101. Also, the support 108 has the hole portions 108A through which the blades 107 are able to pass, respectively. Thus, it is possible that the blades 107 go through the hole portions 108A and are inserted into the slots 200B, respectively, of the stator core 200 supported by the support 108.

As shown in FIG. 2, a width W1 of a gap between end portions of the insulating paper 300 that face each other, the insulating paper 300 being inserted into the slot 200B of the stator core 200, is larger than a width W2 of a gap between the pawl portions 102 neighboring each other. Thus, the end surface of the insulating paper 300 on the side of the defense cuff support 101 (hereinafter, referred to as an "upper end surface") and an end surface of the pawl portion 102 on the side of the stator core 200 (hereinafter, referred to as a "lower end surface") come into contact with each other. Therefore, when the blade 107 is inserted into the slot 200B, it is possible to prevent the insulating paper 300 from shifting to the defense cuff support 101 side due to friction between the blade 107 and the insulating paper 300.

Figure 3:
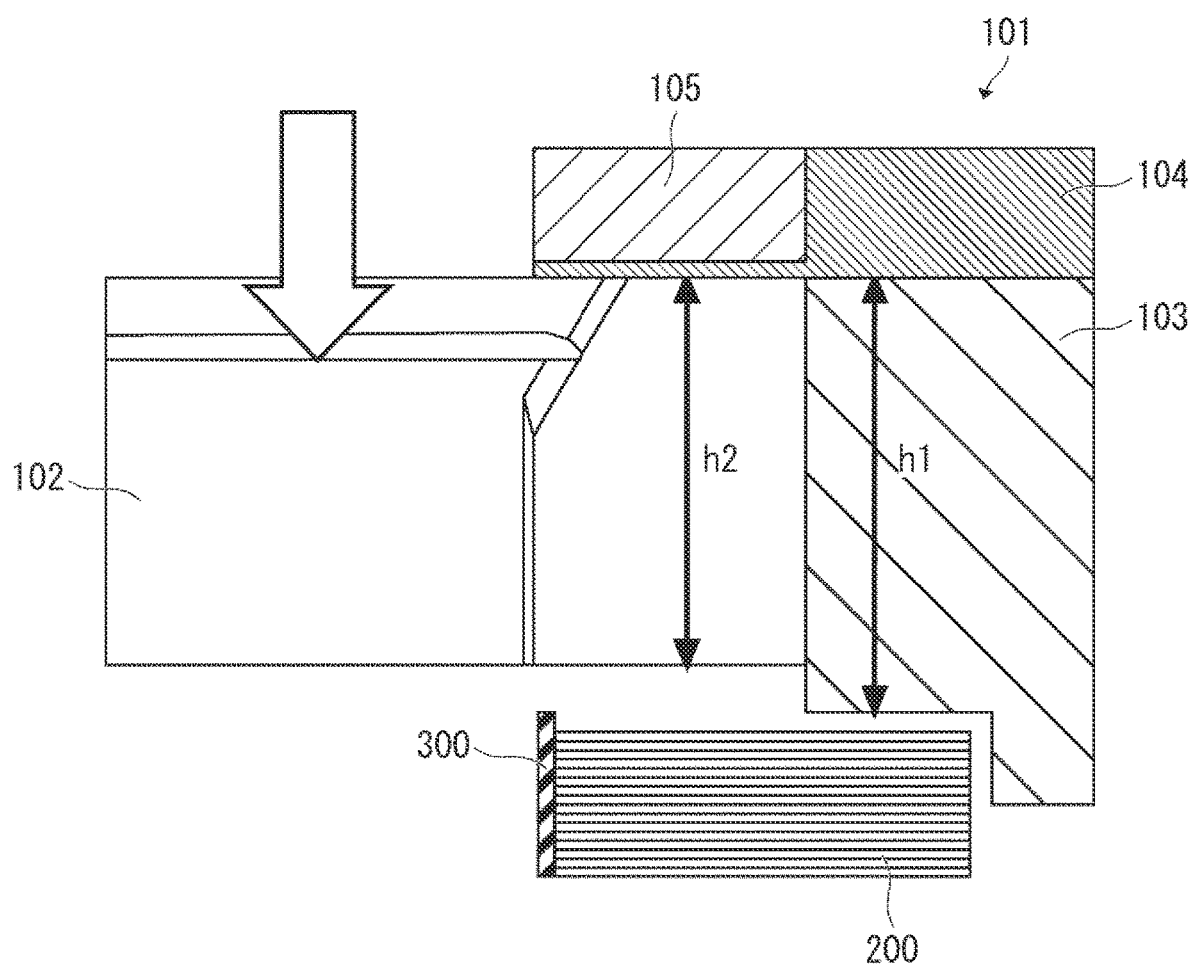
FIG. 3 is a view showing sections of the defense cuff support, a stator core, and insulating paper taken along the line III-III shown in FIG. 1.

Further, FIG. 3 shows sections of the defense cuff support 101, the stator core 200, and the insulating paper 300 taken along the line III-III shown in FIG. 1. FIG. 3 shows a state where the pawl portion 102 protrudes from the inner peripheral surface of the defense cuff support 101. Also, in FIG. 3, the thick arrow shows an insertion direction of the coil (not shown) to the slot 200B of the stator core 200.

As shown in FIG. 3, a thickness h1 of a portion of the guide portion 103 corresponding to at least the stator core 200 is larger than a thickness h2 of the pawl portion 102. Thus, while the stator core 200 is moved closer to the defense cuff support 101 by the support 108, or the blade 107 is inserted into the slot 200B of the stator core 200, when the stator core 200 is tilted, the end surface of the stator core 200 on the side of the defense cuff support 101 (hereinafter, referred to as an "upper end surface"), and the end surface of the guide portion 103 on the side of the stator core 200 (hereinafter, referred to as a "lower end surface") come into contact with each other. Therefore, it is possible to prevent the stator core 200 from being largely tilted, and it is possible to reduce friction between the blade 107 and the insulating paper 300 caused by tilting of the stator core 200 when the blade 107 is inserted into the slot 200B. Further, it is possible to reduce friction between the coil and the insulating paper 300 caused by tilting of the stator core 200 when the coil is inserted into the slot 200B. Therefore, it is possible to reduce shift of the insulating paper 300 caused by tilting of the stator core 200.

The gap between the upper end surface of the stator core 200 and the lower end surface of the guide portion 103 has a size to an extent that does not negate an effect that is obtained by the fact that the width W1 of the gap between the end portions of the insulating paper 300 inserted into the slot 200B, the end portions facing each other, is larger than the width W2 of the gap between the pawl portions 102 neighboring each other. In other words, the gap between the upper end surface of the stator core 200 and the lower end surface of the guide portion 103 has a size that allows the upper end surface of the insulating paper 300 to come into contact with the lower end surface of the pawl portion 102 even when the stator core 200 is tilted.

Next, with reference to FIG. 4, a method for assembling the coil according to the first embodiment is described. First, as shown in FIG. 4, the insulating paper 300 is inserted into the slot 200B of the stator core 200 (step S1). Next, the apparatus 100 for assembling the coil allows the pawl portions 102 to protrude from the inner peripheral surface of the defense cuff support 101 (step S2). Next, the apparatus 100 for assembling the coil allows the support 108 on which the stator core 200 is mounted to move closer to the defense cuff support 101, and lifts the stator core 200 (step S3). Next, the apparatus 100 for assembling the coil inserts the blade 107 into the slot 200B into which the insulating paper 300 is inserted (step S4). Next, the apparatus 100 for assembling the coil inserts the coil into the slot 200B in which the blade 107 is inserted, the coil being inserted in a direction opposite to the direction in which the blade 107 is inserted (step S5). At this time, the apparatus 100 for assembling the coil pulls the blade 107 out from the slot 200B along with the insertion of the coil into the slot 200B.

With the apparatus 100 for assembling the coil, and the method for assembling the coil according to the first embodiment, the blade 107 allows the coil to be inserted in the state where the insulating paper 300 is widened. Therefore, the step of arranging the insulating paper 300 so that both ends of the insulating paper 300 (the end portion on the side of the defense cuff support 101, and the end portion on the opposite side thereof) protrude from the slot 200B, and processing the protruding portions into a tapered shape is not necessary. Further, it is not necessary to use extra material for the insulating paper 300. Although the method for assembling the coil according to the first embodiment requires a new step of inserting the blade 107, time required for this step is much shorter than the step of processing the both ends of the insulating paper 300 into the tapered shape. Therefore, it is possible to provide the method for assembling the coil, and the apparatus 100 for assembling the coil by which shift of the insulating paper 300 is restrained more easily.

Further, the width W1 of the gap between the end portions of the insulating paper 300 inserted into the slot 200B of the stator core 200, the end portions facing each other, is larger than the width W2 of the gap between the pawl portions 102 neighboring each other. Thus, the upper end surface of the insulating paper 300 and the lower end surface of the pawl portion 102 come into contact with each other, and, when the blade 107 is inserted into the slot 200B, it is possible to prevent the insulating paper 300 from shifting to the side of the defense cuff support 101 due to friction between the blade 107 and the insulating paper 300.

Further, the thickness h1 of the portion of the guide portion 103 corresponding to at least the stator core 200 is thicker than the thickness h2 of the pawl portion 102. Thus, it is possible to reduce friction between the coil and the insulating paper 300 caused by tilting of the stator core 200 when the coil is inserted into the slot 200B. Therefore, it is possible to reduce shift of the insulating paper 300 due to tilting of the stator core 200.

The present disclosure is not limited to the embodiment described above, and changes may be made as necessary without departing from the gist of the present disclosure.

What is claimed is:

1. A method for assembling a coil, the method comprising:
   a step of inserting insulating paper into a slot of a stator core;
   a step of protruding a plurality of pawl portions from an inner peripheral surface of a defense cuff support, wherein a pawl portion corresponds to a tooth of the stator core;
   a step of inserting a blade into the slot into which the insulating paper is inserted; and
   a step of inserting the coil into the slot into which the blade is inserted, the coil being inserted in a direction opposite to a direction in which the blade is inserted into the slot, wherein, in the step of inserting the coil, the blade is pulled out from the slot along with the insertion of the coil into the slot, wherein:
   the defense cuff support is arranged on a side of the stator core opposite to a side where the blade is inserted; and
   a width of a gap between end portions of the insulating paper inserted into the slot of the stator core, the end portions facing each other, is larger than a width of a gap between the pawl portions neighboring each other.

2. An apparatus for assembling a coil, the apparatus comprising a blade inserted into a slot of a stator core in a state where insulating paper is inserted into the slot, and a defense cuff support including a plurality of pawl portions, wherein a pawl portion corresponds to a tooth of the stator core, wherein:
- the insulating paper is inserted into the slot of the stator core;
- the blade is inserted into the slot into which the insulating paper is inserted;
- the coil is inserted into the slot into which the blade is inserted, the coil being inserted in a direction opposite to a direction in which the blade is inserted into the slot;
- when the coil is inserted into the slot, the blade is pulled out from the slot along with the insertion of the coil into the slot;
- the defense cuff support is arranged on a side of the stator core opposite to a side where the blade is inserted; and
- a width of a gap between end portions of the insulating paper inserted into the slot of the stator core, the end portions facing each other, is larger than a width of a gap between the pawl portions neighboring each other.

3. The apparatus according to claim 2 further comprising a support that supports the stator core so as to allow the stator core to move closer to or away from the defense cuff support, wherein:
- the defense cuff support further includes a guide portion that supports the pawl portions so as to allow the pawl portions to move in and out along a radial direction of the stator core; and
- a thickness of a portion of the guide portion corresponding to at least the stator core is larger than a thickness of the pawl portion.

* * * * *